(No Model.) 2 Sheets—Sheet 1.

T. WILLIAMS, Jr.
MEAT CUTTER.

No. 388,940. Patented Sept. 4, 1888.

Witnesses:
Edwin A. Finckel
Geo. M. Copenhaver

Inventor: Thomas Williams Jr.
by Wm. N. Finckel, his atty.

(No Model.) 2 Sheets—Sheet 2.

T. WILLIAMS, Jr.
MEAT CUTTER.

No. 388,940. Patented Sept. 4, 1888.

Fig 5ª.

Witnesses:
Edwin A. Finckel.
Geo. M. Copenhaver.

Inventor:
Thomas Williams Jr.
by Wm H. Finckel, his atty.

UNITED STATES PATENT OFFICE.

THOMAS WILLIAMS, JR., OF 45 MYDDELTON SQUARE, COUNTY OF MIDDLESEX, ENGLAND.

MEAT-CUTTER.

SPECIFICATION forming part of Letters Patent No. 388,940, dated September 4, 1888.

Application filed February 7, 1888. Serial No. 263,285. (No model.)

*To all whom it may concern:*

Be it known that I, THOMAS WILLIAMS, the younger, a subject of Her Majesty the Queen of Great Britain and Ireland, residing at 45 Myddelton Square, in the county of Middlesex, England, engineer, have invented new and useful Improvements in Meat-Cutters, of which the following is a specification.

This invention relates to improvements in machines for cutting or mincing plastic or yielding substances—such as meat, suet, and the like—wherein the substance to be cut or minced is forced, by means of a feed-screw, in a partially-cut state through a perforated plate revolving against a fixed knife or knives, and filled into skins or delivered into suitable receptacles, by which improvements quicker and more certain cutting and economy of construction are insured.

The invention consists in the combination and arrangement of parts, substantially as hereinafter more particularly set forth and claimed.

Figure 1:
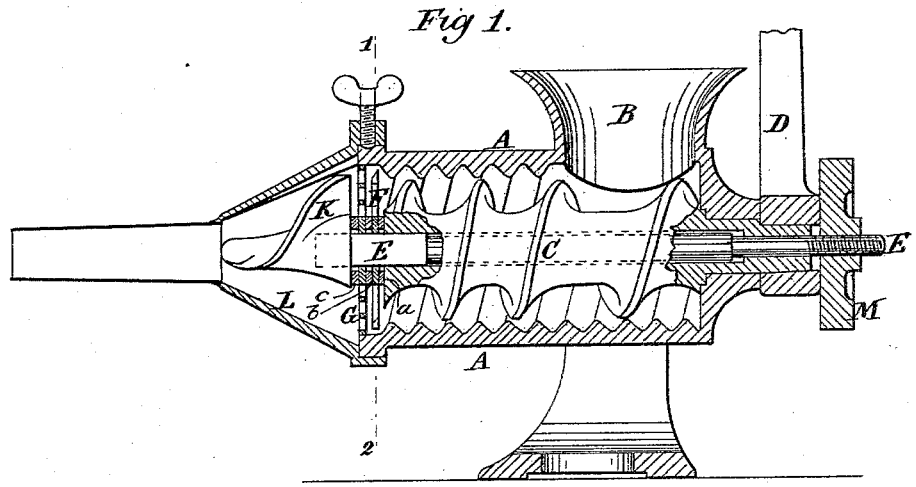
Figure 2:
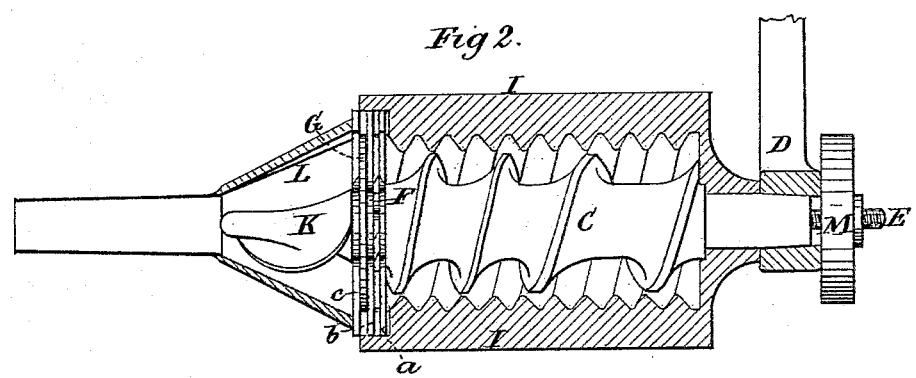
Figure 3:
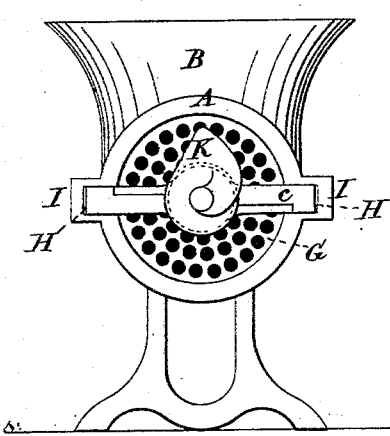
Figure 4:
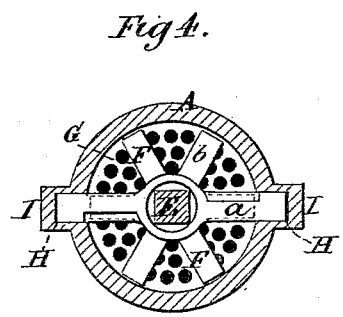
Figure 5:
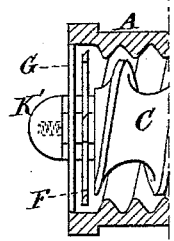
Figure 6:
Figure 6:
Figure 7:
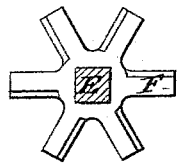
Figure 8:
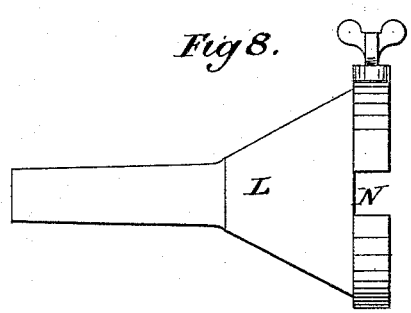

In the accompanying drawings, Figure 1 is a sectional elevation of the machine. Fig. 2 is a horizontal section of the same. Fig. 3 is a view of the delivery end of the machine with the filling-nozzle removed. Fig. 4 is a transverse section taken along the line 1 2 in Fig. 1, looking from the rear or feed end of the machine. Fig. 5 is a sectional view of the delivery end of the machine when used as a mincer only. Fig. 5ª illustrates a detached view of a modified form of forcing-screw. Fig. 6 is a detached view of one of the stationary knives. Fig. 7 is a detached view of the revolving cutter. Fig. 8 is an elevation, and Fig. 9 an end view, of the filling-nozzle.

A is the usual casing, preferably cast in one piece and provided with the well-known internal spiral grooves. B is the hopper; C, the ordinary forcing-screw, to the journal at the rear end of which is suitably attached the handle or driving-wheel D. I have, however, found a better result to be obtained by the use of a forcing-screw, consisting of two, three, or more spiral blades or wings mounted on an axis, each blade or wing making about one-third of a turn in its length, as shown at C', Fig. 5ª. I lay no separate claim to this form of forcing-screw, however. Through the axis of the forcing-screw C passes a spindle, E, upon which is loosely mounted, for the sake of adjustment, yet so as to turn therewith, (said spindle being by preference of a square or polygonal section at one end for that purpose,) a revolving cutter, F, having two, three, or more radial blades, all revolving in the same plane, and provided with a square or polygonal-shaped opening in the center, through which the spindle E passes. The cutting-edges of these radial blades work against the cutting-edges of a stationary knife, a, extending across the casing between the revolving cutter and the end of the forcing-screw. Upon the opposite side of the cutter F is the stationary knife b, of similar construction to the knife a, the cutting-edge of which is in contact with the inner face of a revolving perforated plate, G, also threaded upon the spindle E and rotating therewith. A third stationary knife, c, of similar construction to a and b, bears with its cutting-edge against the outer face of the rotating perforated plate G. These stationary knives a, b, and c are all threaded upon the spindle E, which passes through and can turn freely within circular openings in their centers, and the extremities of the said knives rest in slots H, formed in the ribs or projections I on the casing A.

K is the supplementary propeller for filling the cut or minced meat or other substance into skins or suitable receptacles, if required, and L is the filling-nozzle, both of which may be of the kind described in the specification to my patent, No. 366,706, dated July 19, 1887, with the exception that the propeller is not provided with a cutting-edge, and is not in contact with the perforated plate, but bears against the outer stationary knife, c. The forcing-screw, rotating cutter F, rotating perforated plate G, and stationary knives a, b, and c, being all threaded on the spindle E, may be simultaneously adjusted by turning a nut or wheel, M, on the rear end of the spindle, which, on being tightened, draws them all closely together by means of the supplementary propeller K, which is firmly attached to the spindle and bears against the outer stationary knife. When the machine is to be used for mincing alone, this supplementary propeller may be dispensed with and a suitable head formed upon the spindle in lieu thereof, as shown at K', Fig. 5.

Figure 9:
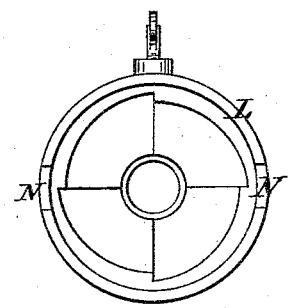

The action of the machine is as follows: On rotating the forcing-screw the spindle E (the square or polygonal-shaped portion of which extends a short distance into a corresponding recess in said forcing screw, as shown in Fig. 1) is rotated, and with it the revolving cutter F, rotating perforated plate G, and supplementary propeller K, (when the machine is to be used as a filler also.) The meat or other substance is fed in at the hopper B, and carried by the forcing-screw C up to the rotating cutter F, between which and the stationary knife $a$ it receives its preliminary cutting. In this partially-cut condition it is still forced onward until it reaches the revolving perforated plate G, which by its rotation completes the cutting of the meat or other substance against the stationary knives $b$ and $c$ in contact with its inner and outer faces, respectively. The minced substance is then, if desired, forced into skins or other receptacles by the supplementary propeller K, in conjunction with the filling-nozzle L. Suitable notches, N, are made in the periphery of the large end of the nozzle, as shown in Figs. 8 and 9, to enable it to fit over the ribs I on the casing, to which it may be secured by a thumb-screw in the ordinary manner.

On detaching the handle or driving-wheel all the working parts may be removed together for the purpose of cleaning by simply removing the filling-nozzle (when the machine is employed as a filler also) and withdrawing them from the delivery end of the casing.

Among the chief advantages of a machine constructed as hereinbefore described are the following: All the cutting parts being arranged close to the perforated plate, a feed-screw of greater length and extending much nearer to such plate may be employed than can be used ordinarily in machines wherein the meat receives a preliminary cutting before reaching the perforated plate, with the result that the action of the feed-screw is exerted forcibly upon the meat right up to the plate, and a very much quicker delivery obtained, while little or no meat will be found in the machine after the mincing is finished. By dispensing with the usual series of cutters rotating in different vertical planes and employing in lieu thereof a star cutter having several blades rotating in one plane, the number of parts, and consequently the expense, are greatly reduced, while the meat is less liable to collect around and between the cutters and clog the machine. All the working parts being mounted on the driving-spindle, they can be simultaneously adjusted and readily removed for cleaning or repairing purposes, while the work involved in fitting the machine together is greatly diminished. By the employment of a rotating perforated plate revolving between fixed knives extending right across and bearing closely against each of its faces a much thinner plate than heretofore may be used without fear of buckling, by reason of the support afforded by the knives, the advantages of using a thin plate being that it may be readily stamped from sheet-steel in lieu of being cast, while the perforations are less liable to become clogged, the meat passing more readily through them.

What I claim, and desire to secure by Letters Patent of the United States, is—

The herein-described machine for cutting meat, consisting of the shell or casing A, having the usual hopper, B, the forcing-screw C, extending from the hopper practically up to the perforated-plate, the rotary spindle E, upon which the said screw is longitudinally movable, the perforated plate G, stamped up from sheet-steel and fixed to rotate with the said spindle, the knives $b$ $c$, through which the spindle is passed and which rest stationarily in slots H in the casing, and are arranged in close cutting contact upon opposite sides of the said perforated plate, the stationary knife $a$, extending across the casing between the revolving cutter F and the end of the forcing-screw, the said revolving cutter F secured to the said spindle between the stationary knives $a$ and $b$, the supplemental propeller K, fixed to one end of the spindle, and the adjusting-nut M, acting against the casing and upon the spindle to tighten or draw together the forcing-screw, knives, and plate, all combined and arranged to operate substantially as shown and set forth.

In witness whereof I have signed my name in the presence of two subscribing witnesses.

THOMAS WILLIAMS, Jr.

Witnesses:
   A. E. ALEXANDER,
      36 *Southampton Buildings, W. C.*
   F. J. RAPSON,
      36 *Southampton Buildings, London.*